United States Patent
Skulley et al.

(10) Patent No.: US 6,622,029 B1
(45) Date of Patent: Sep. 16, 2003

(54) ONE-HAND ADJUSTABLE HEADBAND HEADSET

(75) Inventors: Gerald Skulley, Santa Cruz, CA (US); Chris Labak, Chicago, IL (US); Randy Fette, Santa Cruz, CA (US); Fred Polito, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 434 days.

(21) Appl. No.: 09/637,503

(22) Filed: Aug. 11, 2000

(51) Int. Cl.⁷ .................................................. H04Q 7/32
(52) U.S. Cl. ...................... 455/568; 455/550; 379/430; 379/454; 381/376; 381/378; 381/379
(58) Field of Search ................................ 455/568, 550, 455/575, 90, 569; 379/430, 431, 428.01, 449, 446, 454, 455; 381/376, 378, 379

(56) References Cited

U.S. PATENT DOCUMENTS

| | | | |
|---|---|---|---|
| 4,409,442 A | * | 10/1983 | Kamimura ................... 379/430 |
| 4,634,816 A | * | 1/1987 | O'Malley et al. ........... 379/430 |
| 4,754,484 A | | 6/1988 | Larkin et al. |
| 4,882,745 A | | 11/1989 | Silver |
| 5,117,465 A | | 5/1992 | MacDonald |
| 5,369,857 A | | 12/1994 | Sacherman et al. |
| 5,381,486 A | | 1/1995 | Ludeke et al. |
| D361,066 S | | 8/1995 | Langhorn et al. |
| 6,363,147 B1 | * | 3/2002 | Maxwell ..................... 379/430 |
| 6,385,325 B1 | * | 5/2002 | Nageno et al. ............. 379/430 |

* cited by examiner

*Primary Examiner*—William Trost
*Assistant Examiner*—Keith Ferguson
(74) *Attorney, Agent, or Firm*—Peter Hsieh

(57) ABSTRACT

A headset capable of being donned with one hand comprises a headband with a variety of possible hinges disposed between the edges of the headband. In response to flexing the hinge by bringing the edges of the headband towards each other, the headband opens up sufficiently to allow a user to place the headband comfortably over his head, releasing the hinge to provide a snug fit.

16 Claims, 2 Drawing Sheets

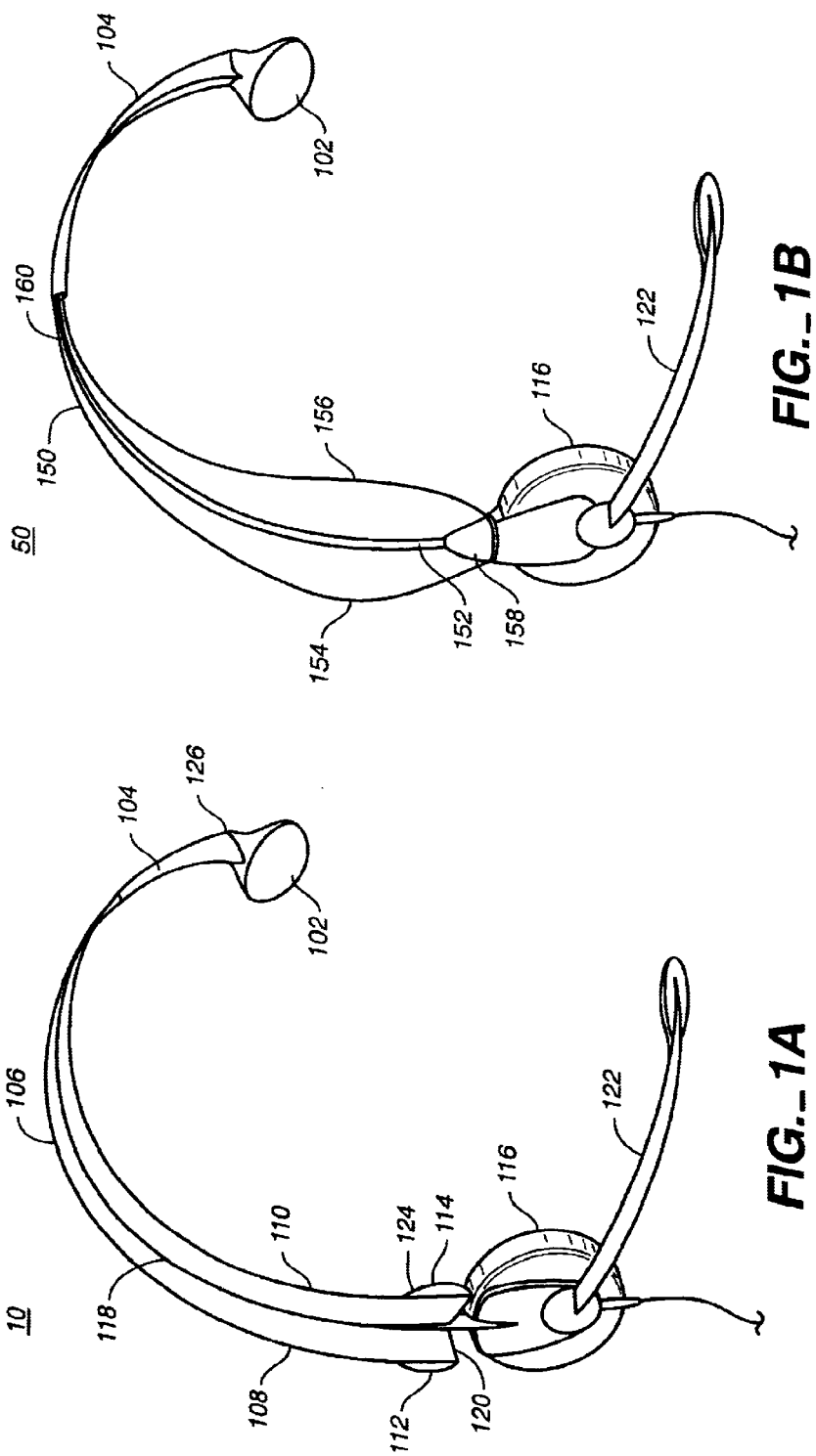

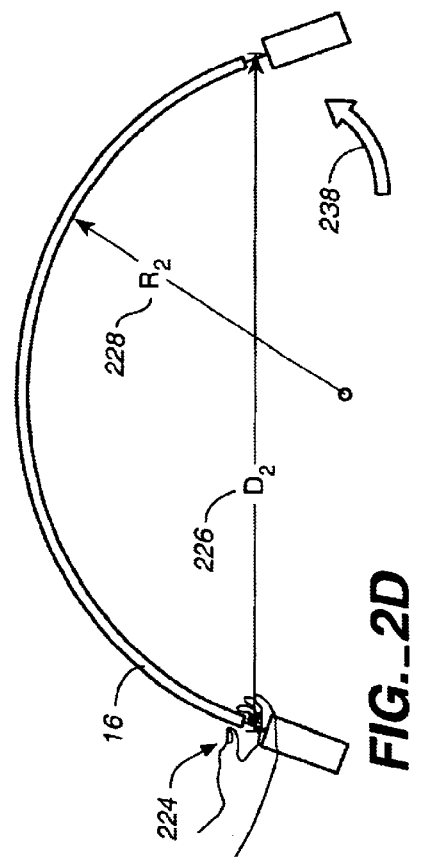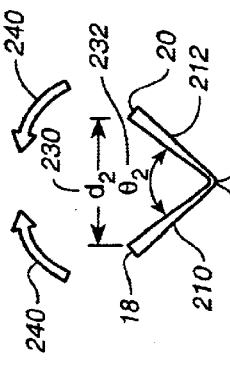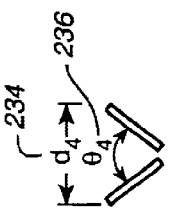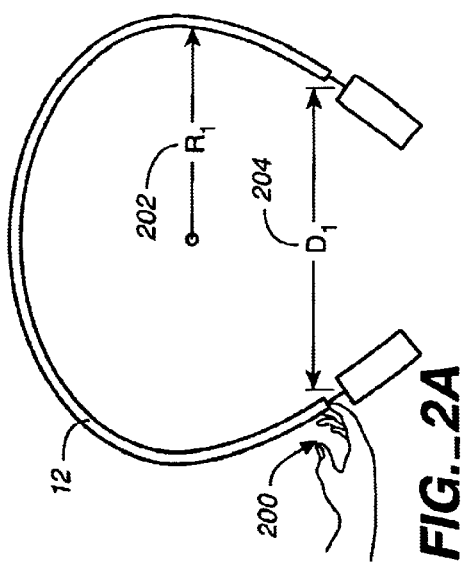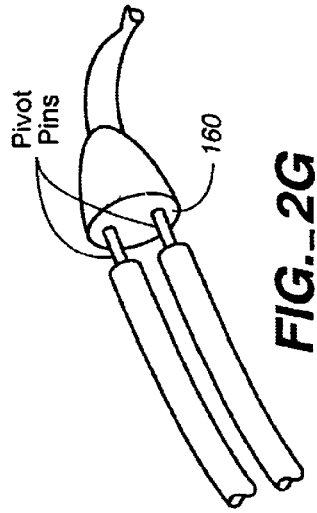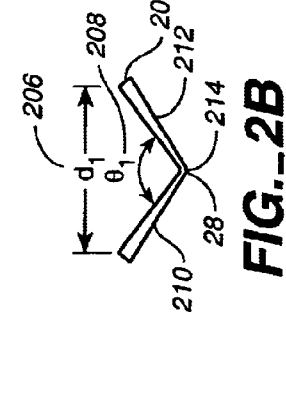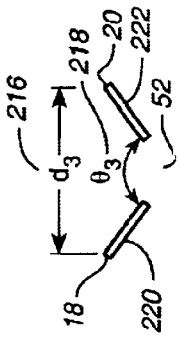

ONE-HAND ADJUSTABLE HEADBAND HEADSET

BACKGROUND

1. Field of the Invention

The present invention relates generally to the field of telephonic communication, and more particularly, to communication headsets.

2. Background of the Invention

The replacement of traditional telephone handsets with headsets has significantly improved productivity in telephone-intensive occupations such as technical sales support and telemarketing. A study by H.B. Maynard & Co. found that productivity was 43% higher for headset-equipped workers in telephone intensive occupations than handset users. One problem, however, is that many users prefer not to wear their headsets for extended periods of time. These workers typically remove their headsets after each telephone call. As a result, their efficiency in terms of call answering is actually less than that of handset users because two hands are required to don headsets. The worker must stop his current task, pick up the headset, adjust it to his head using both hands, and then continue what he was previously doing. This process is especially inconvenient during intervals of frequent, unexpected telephone calls. It would be more efficient and convenient, therefore, if a user could don a headset with only one hand.

Currently, there are two styles of headsets that offer the possibility of one-handed deployment. The "over-the-ear headset" situates an audio receiver near one of the user's ears with an earhook that is formed to fit around the top and back of the ear. A second style, known as an "ear hang headset," has a small receiver capsule which fits into the concha of the user's ear. Both the earhook and the ear hang headsets can be donned with one hand in theory, but, in practice, adjustments for proper fit typically require both hands and are often time consuming.

The most common style of headset is a headband headset having either one or two audio receivers (monaural or binaural, respectively) that fit over the wearer's ears. Headband headsets generally require two hands to don. The band is constructed in arcuate form from a resilient material, usually including a plastic section that slides up and down, allowing the user to adjust band size and tension. The band is sized smaller than an average user's head size to provide sufficient tension to ensure stability. Because of this, the user must grasp both ends of the headband and pull it far enough apart to fit over the user's head.

Although headband headsets require two hands to deploy, they offer a number of advantages not available in earhook and ear hang headsets. Because of wide variations in the size and orientation of human ears, many users cannot wear earhook or ear hang headsets without discomfort or significant adjustment, which often requires two hands. Headbands, by contrast, provide snug, secure fits to a wide variety of users. Headbands also allow the user to choose between monaural and binaural headsets. Binaural headsets typically provide superior acoustical performance, particularly in noisy environments. For these reasons, the versatility of headband headsets is often preferred to earhook and ear hang headsets.

Accordingly, what is needed is a headband headset the user can don using only one hand and that provides a secure fit for either monaural or binaural headsets.

SUMMARY OF THE INVENTION

The present invention overcomes the limitations of conventional headset designs by providing a headband headset that the user can easily don with one hand by opening the headset sufficiently to fit onto the user's head. This allows the user to quickly pick up the headset and place it on his head using only one hand.

A headset in accordance with one embodiment of the present invention includes a headband with first and second edges. The curvature of the headband is described by its average radius of curvature. In its initial configuration, the average radius of curvature is such that the distance between first and second ends of the headband is slightly less than the width of an average human head. The headband is formed from a flexible, resilient material so that the average radius of curvature is variable in response to bringing the first and second edges towards each other. This may be done by the user, with one hand, by applying pressure to the edges and squeezing them together. As the edges are brought towards one another, the average radius of curvature of the headband increases until the distance between the headband ends is at least slightly greater than the width of an average human head. Once the headband has expanded sufficiently, the user can place it over his head, position it on his ears, and then allow the edges to return to their previous position by releasing the pressure on the edges. As this is done, the headband's average radius of curvature decreases until the headband securely fits the user's head.

In one embodiment, the present invention includes a substantially C-shaped headband with two edges. As the edges are brought towards each other by applied pressure, the headband's shape changes from its original, roughly C-shaped configuration to a shape having a substantially straight portion. When the headband is opened in this manner, the user can position it across his head and release the edges, allowing the headband to gently wrap around the user's head. Thus, the user can easily pick up the headset, apply pressure to the edges, and position the headset with one hand.

In another embodiment, at least a portion of the headband's cross-section is shaped in the form of a V. That portion is arcuate in shape, and may again be described by its average radius of curvature. The cross section is further defined by the interior angle between the first and second legs of the V. The radius of curvature depends on the interior angle of the cross section, and so the user can don the headset by applying pressure to the legs of the V-shaped cross section to decrease the angle therebetween. This action increases the radius of curvature sufficiently to allow the headset to easily fit over the user's head. Once placed on the head, the user releases the legs of the V, which then increases the angle and decreases the radius until the headset fits snugly about the ears.

In yet another embodiment of the invention, the headset has a substantially C-shaped headband with a hinge extending lengthwise along at least a curved portion of the headband. A pick-up area, which can be grasped with one hand, is located on the headband for closing the hinge. As the hinge is closed, it straightens, forcing the area of the headband including the hinge to straighten as well. This opens up the headband and allows it to be positioned on the head. Because the entire headband need not assume a substantially straight shape to allow the user to don the headband, the hinge does not need to extend along the entire headband. As the user releases pressure, the hinge opens and the headband returns to its substantially C-shaped configuration.

In another aspect, the headset again has a substantially C-shaped headband with a gap extending lengthwise-along at least a portion of the headband. A pick-up area is located on the headband for closing the gap by applying pressure using one hand. As the gap closes, the portion of the headband containing the gap becomes substantially straight. Again, this opens open the headset to allow the user to place it easily on his head using only one hand.

In still another aspect of the present invention, a method is provided for donning a communications headset comprising a headband with a radius of curvature responsive to bringing the edges of the headband towards each other. The method includes grasping the edges of the headband (which can be done with one hand), exerting sufficient force to bring the edges towards each other, thereby increasing the radius of curvature of the headband, positioning the headband across the head, and releasing the hand from the first and second edges of the headband to allow the headband to curve onto the head.

The foregoing features and embodiments advantageously provide a comfortable headband headset that can be donned with one hand. The features and advantages described in this summary and the following detailed description, however, are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1A is a perspective view of a headband headset according to an embodiment of the present invention;

FIG. 1B is a perspective view of a headband headset according to an embodiment of the present invention;

FIG. 2A is a front view of a headband headset in its relaxed position according to an embodiment of the present invention;

FIG. 2B is a cross-sectional view of a headband headset in a relaxed position according to an embodiment of the present invention;

FIG. 2C is a cross-sectional view of a headband headset in its relaxed position according to an embodiment of the present invention;

FIG. 2D is a front view of a headband headset in a flexed position according to an embodiment of the present invention;

FIG. 2E is a cross-sectional view of a headband headset in a flexed position according to an embodiment of the present invention;

FIG. 2F is a cross-sectional view of a headband headset in a flexed position according to an embodiment of the present invention; and FIG. 2G is a perspective view illustrating pivot pins at a transition joint of the headband headset in more detail.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Referring now to FIG. 1A, there is illustrated one embodiment of a headset in accordance with the present invention. Headset 10 includes a headband 106 with an audio receiver 116 coupled to a first end 120 of the headset 10 and a temple pad 102 attached to a slide tube 104 at a second end 126 of the headset 10. The headband 106 slideably inserts into the slide tube 104, allowing size adjustments. A microphone boom 122, or alternatively, a voice tube, connects to the audio receiver 116. A second audio receiver could replace temple pad 102 to form a binaural headset.

Headband 106 is arcuate in shape with a first edge 108 and a second edge 110, corresponding to the exterior, or outer, edges of the headband 106. A pick-up area 124, including a first finger pad 112 on the first edge 108 and a second finger pad 114 on the second edge 110, is located near the first end 120 of the headset 10. Alternatively, the pick-up area includes one pad extending from edge 108 to edge 110. The pick-up area 124 can be located anywhere along the portion of the headband 106 including a hinge 118, as further explained below, or omitted entirely. The pick up area 124 may include finger pads which extend away from the edges 108, 110, as shown, or may be indents in the headband 106, or may be omitted entirely. The headband 106 can be fabricated from a number of commercially available materials, including polypropylene and nylon. One of skill in the art will recognize, however, that many different materials with similar properties could be used within the scope of the present invention.

Further, in this embodiment the headband 106 includes a flexible hinge 118 extending along at least a portion of the headband 106. One embodiment has a hinge distance of 60 percent of the overall circumference. It could, however, extend either over substantially the entire head band portion or a lesser portion thereof, depending on the performance desired.

In one embodiment, thinning the material of the headband between the first edge 108 and the second edge 110 forms the hinge 118, which preferably runs down the center of the headband 106. FIG. 2B shows the portion of the headband 106 containing the hinge 118 in cross section. The exterior edges 108, 110 angle out of the plane containing the hinge 118, thus forming a V-shape cross section of the headband 106. A first leg 210 and a second leg 212 correspond to the legs of the V. The legs 210, 2,12 extend from the hinge 118 to the edges 108, 110 at an interior angle $\theta_1$ with respect to each other, the edges disposed a distance $d_1$ apart. In one embodiment, the angle varies from approximately 120 degrees at the finger pads to 180 degrees at the end of the headband, although other ranges provide similar functionality. The hinge 118 allows the user to pinch the edges 108, 110 together, thus decreasing $\theta_1$ and causing the portion of the headband 106 containing the hinge to straighten, as explained below in more detail. Because the hinge straightens in response to decreasing the angle $\theta_1$ between the legs 210, 212, the user can pick up the headset 10, apply pressure to the edges 108, 110, thus causing the headset 10 to open up, and position the headset 10 with one hand.

Referring now to FIG. 1B, headset 50, another preferred embodiment, is shown. The alternate headband 150 includes a flexible spring hinge gap 52 formed by a gap between flexible springs (also referred to as "legs" or "blades") 220, 222, extending along at least a portion of the headband 150 from the real hinge apex 158 (the start of the spring hinge gap 152), to where the two headband flexible springs 220, 222 meet at the transition joint 160. In one embodiment, the flexible spring hinge gap is approximately ¼ inch wide by 5 inches long. Adding a short flexible support web 162 approximately ½ inch above the real hinge apex 158 will improve the opening performance of the headband by maintaining the gap under finger pressure. The web 162 is most conveniently constructed from the same material as the headband, although any material which functions to maintain separation of the flexible springs 220,222 maybe substituted. As shown in FIG. 2G, adding pivot pins where the two headband flexible springs 220, 222 meet at the transition joint 160 will also improve the headband opening performance by lengthening the effective flexible hinge without additional pressure applied to the edges. The pins constrain the springs 220, 222 while allowing the ends freedom to rotate.

The real hinge apex 158 enables flexing of the edges 154, 156 in response to user-applied pressure. FIG. 2C shows the portion of headband 150 containing the flexible spring hinge gap 152 in cross section. The cross section is V-shaped, although the apex of the V is cut off. The V is again described by a first flexible spring or leg 220 and a second flexible spring or leg 222, corresponding to the truncated legs of the V. The flexible springs 220, 222 are disposed at an interior angle $\theta_3$ apart, the edges 154, 156 a distance $d_3$ from each other.

FIGS. 2A and 2D depict a headset fabricated in accordance with the present invention. The headband transforms from substantially C-shaped, prior to user-applied pressure on the edges, as shown in FIG. 2A, to an open position, following user applied pressure to the edges, as shown in FIG. 2D. FIGS. 2B and 2C, again, show headbands 106 and 150, respectively, in cross section prior to the user bringing the edges 108, 110 or 154, 156 together. FIGS. 2E and 2F depict the cross sections of headbands 106 and 150 after the user has pinched the edges together. Although the following illustration is described with reference to headset 10, it is understood that the same description applies to the operation of headset 50, description of which is omitted for the sake of brevity.

Referring now to FIGS. 2A, 2B, 2D and 2F, the response of headset 10 to user-applied pressure is illustrated in detail. The headset 10 has an initial radius of curvature $R_1$. $R_1$ is such that the distance $D_1$, measured between earphone 116 and temple pad 102, is slightly less than the width of an average human head so that the headband 106 supplies sufficient tension to hold the headset 10 in place on the user's head. Typical values for $R_1$ and $D_1$ are approximately 2.5 inches and 3.5 inches respectively. A user's hand 200 is depicted adjacent pick up area 124. As the user applies pressure to the pick up area 124, the angle $\theta_1$ decreases, as does the distance $d_1$ between the first edge 108 and the second edge 110, as shown in FIG. 2E (see FIG. 2F for reference to the headset 50 containing the flexible spring hinge gap 152 in operation). Arrows 240 illustrate the decrease of the angle between the first leg 210 and the second leg 212 from the initial angle $\theta_1$ to the final angle $\theta_2$. In response, the hinge 118 straightens out, forcing the portion of the headband 106 containing the hinge to straighten as well, as shown as shown by arrow 238 in FIG. 2D. In response to applied pressure, the ends 120, 126 spread a distance $D_2$ apart and the radius of curvature $R_1$ increases to $R_2$. Distance $D_2$ is at least slightly larger than the width of the average human head and $R_2$ is at least slightly larger than the radius of curvature of the average human head. Typical values for D2 and R2 are 14 inches and 9 inches, respectively. Thus, the headset 10 opens up in response to user-applied pressure to the edges 108, 110 of the headset 10, allowing the user to easily don the headset 100 with one hand.

The foregoing description of the invention has been directed to an illustrative embodiment for purposes of explanation and illustration of various aspects of the invention. Numerous variations are possible. For example, the hinge or gap may extend completely, or only partially, along the headband. The material of the headband could be of varying thickness, as could the hinge. Various types of hinges could be utilized. The pick-up area could be located in any position along the portion of the headband containing the hinge or gap, or eliminated entirely. Further, the legs of the V could be disposed at various initial angles, from 150 degrees to 90 degrees, for example. The legs may be curved or otherwise complex instead of straight. It is the nature of mechanical apparatuses such as the present invention that those of skill in the art may make numerous substitutions, modifications, and alterations to the disclosed embodiments without departing from the scope of the invention.

What is claimed is:

1. A headset comprising:
   an arcuate headband with a first edge and a second edge; and
   a first end and a second end separated by a distance therebetween, each of the first and second edges of the headband extending from approximately the first end toward the second end, the distance between the first and second ends increasing from slightly less than the width of an average human head to at least slightly greater than the width of an average human head in response to the first and second edges being brought towards each other by applied pressure.

2. The headset of claim 1 wherein the headband is made of a material selected from the group consisting of polypropylene and nylon.

3. A headset comprising:
   a headband with a first edge and a second edge, the edges extending along at least a portion of an arcuate length of the headband, the headband having an average radius of curvature that increases from slightly less than that of an average human head to slightly greater than that of an average human head in response to the first an second edges being brought towards each other by applied pressure.

4. A headset comprising: a headband with a first edge and a second edge, the edges extending along at least a portion of an arcuate length of the headband, the headband varying from a substantially C-shape to a substantially straight shape in response to the edges being brought towards each other.

5. A headset comprising:
   a headband, at least a portion of the headband having a V-shaped cross section taken approximately perpendicular to a plane generally defined by the headband, the V-shaped cross section comprising a first leg, a second leg, and an interior angle between the first and second legs, the portion of the headband having the V-shaped cross section having a radius of curvature dependent on the interior angle.

6. A headset comprising:
   a headband at least a portion of the headband having a V-shaped cross section with a first and second leg of the V-shape, the V-shaped cross section being taken approximately perpendicular to a plane generally defined by the headband, the first leg having a first exterior edge and the second leg having a second exterior edge, the first and second edges disposed a distance apart, the portion of the headband having the V-shaped cross section having a radius of curvature dependent upon the distance between the first and second edges, the radius of curvature increasing as the distance between the first and second edges is decreased.

7. A headset comprising:

a headband substantially defining a C-shape; and a hinge having first and second edges extending lengthwise along at least a portion of the headband and defining at least a portion of the C-shape of the headband, the hinge being closed by pushing the edges toward each other, the first and second edges of the hinge forming a substantially straight shape in response to closing the hinge.

8. A headset comprising:

a substantially C-shaped headband;

a gap extending lengthwise along at least a portion of the headband;

a first an second edge of the headband extending lengthwise along at least the portion of the headband containing the gap, at least the portion of the headband containing the gap forming a substantially straight shape in response to narrowing the gap.

9. The headset of claim 8 wherein the headband is made of a material selected from the group consisting of polypropylene and nylon.

10. The headset of claim 8 further comprising:

a support web deposed within the gap.

11. A headset comprising:

an arcuate headband, at least a portion of the headband having an angled, V-shaped cross-section taken approximately perpendicular to a plane generally defined by the arcuate headband; and a pick-up area located on the headband for decreasing the angle of the cross-section in response to applied pressure, the portion of the headband having the V-shaped cross-section forming a substantially straight shape in response to the decreased angle of the cross section.

12. A headset comprising:

a headband with a first outer edge, a second outer edge, and a flexible spring hinge gap, each extending along at least a portion of a length of the headband a first and second end of the headband, each of the outer edge and the flexible spring hinge gap extending from near the first end toward the second end;

a hinge apex transposed between the first end of the headband and the portion of the headband having the flexible spring hinge gap; and a transition joint located near the end of the hinge gap opposite the hinge apex to enable the first and second edges to rotate towards each other in response to user-applied pressure.

13. The headset of claim 12 wherein the headband is made of a material selected from the group consisting of polypropylene and nylon.

14. The headset of claim 12 further comprising:

a support web formed within the flexible spring hinge gap.

15. The headset of claim 12 wherein the transition joint includes at least one pivot pin.

16. A method of donning a headset comprising a headband with a first edge, a second edge, and a radius of curvature, the edges extending along at least a portion of a length of the headband, the radius of curvature increasing from slightly less than that of an average human head to slightly greater than that of an average human head in response to bringing the edges towards each other, the method comprising:

grasping the first and second edges of the headband with one hand;

exerting opposing forces on the first edge and the second edge to bring the edges toward each other, thereby causing the first and second edges to generally straighten and resulting in an increase in the radius of curvature of the headset;

positioning the headband on the head; and releasing the first and second edges of the headband to allow the headband to curve onto the head.

\* \* \* \* \*